(12) United States Patent
Harries et al.

(10) Patent No.: US 10,584,255 B2
(45) Date of Patent: Mar. 10, 2020

(54) INKJET INK

(71) Applicant: Domino UK Limited, Cambridge (GB)

(72) Inventors: Josephine Harries, Cambridge (GB); Sandra Issartial, Cambridge (GB); Andrew Kyriacou, Cambridge (GB)

(73) Assignee: Domino UK Limited, Cambridge (GB)

( * ) Notice: Subject to any disclaimer, the term of this patent is extended or adjusted under 35 U.S.C. 154(b) by 81 days.

(21) Appl. No.: 15/772,381

(22) PCT Filed: Oct. 28, 2016

(86) PCT No.: PCT/GB2016/053349
§ 371 (c)(1),
(2) Date: Apr. 30, 2018

(87) PCT Pub. No.: WO2017/072521
PCT Pub. Date: May 4, 2017

(65) Prior Publication Data
US 2018/0327621 A1  Nov. 15, 2018

(30) Foreign Application Priority Data

Oct. 30, 2015 (GB) .................................. 1519205.7

(51) Int. Cl.
*C09D 11/322* (2014.01)
*C09D 11/106* (2014.01)
*C09D 11/36* (2014.01)
*C09D 11/38* (2014.01)

(52) U.S. Cl.
CPC .......... *C09D 11/322* (2013.01); *C09D 11/106* (2013.01); *C09D 11/36* (2013.01); *C09D 11/38* (2013.01)

(58) Field of Classification Search
CPC ....... C09D 11/38; C09D 11/36; C09D 11/107; C09D 11/322
USPC .................................................. 523/160, 161
See application file for complete search history.

(56) References Cited

U.S. PATENT DOCUMENTS

| 4,045,397 | A | 8/1977 | Parkinson |
| 5,652,286 | A | 7/1997 | Deng |
| 2004/0110868 | A1 | 6/2004 | Zhu et al. |
| 2005/0090579 | A1* | 4/2005 | Zhu ........................ C09D 11/36 523/160 |
| 2007/0129462 | A1* | 6/2007 | Ma ....................... C09D 11/322 523/160 |

FOREIGN PATENT DOCUMENTS

| EP | 1894977 A1 | 5/2008 |
| WO | 2005040291 A1 | 5/2005 |
| WO | 2008031765 A1 | 3/2008 |
| WO | 2010042104 A1 | 4/2010 |

OTHER PUBLICATIONS

Intellectual Property Office; Search Report in Application No. GB1519205.7; dated Apr. 19, 2016; 1 page.
European Patent Office; International Search Report and Written Opinion in International Application No. PCT/GB2016/0533349; dated Jan. 17, 2017; 8 pages.

* cited by examiner

*Primary Examiner* — Doris L Lee
(74) *Attorney, Agent, or Firm* — Price Heneveld LLP

(57) ABSTRACT

The present invention relates to an inkjet ink comprising a colorant; a first resin; a second resin; an aminosilane; and an organic solvent; wherein the second resin is a styrene maleic anhydride and the second resin is different to the first resin.

20 Claims, No Drawings

INKJET INK

CROSS REFERENCE TO RELATED APPLICATIONS

This application claims benefit of and priority to international application PCT/GB2016/053349 filed on Oct. 28, 2016 and British application GB 1519205.7 filed on Oct. 30, 2015, both entitled "INKJET INK," the entire disclosures of which are incorporated by reference herein.

FIELD OF THE INVENTION

The present invention relates to an inkjet ink comprising a colorant, a first resin, a second resin, an aminosilane and an organic solvent, wherein the second resin is a styrene maleic anhydride and the second resin is different to the first resin. The ink may be used for marking substrates which have condensation thereon and/or returnable articles where the code must be removed to enable reuse of the article.

BACKGROUND OF THE INVENTION

The selective charging and deflection of droplets of ink produced by continuous inkjet printers is a technique used to mark a wide variety of substrates. Meanwhile, valve jet inkjet ink technology is a technique used to mark a wide variety of substrates. Ink is maintained under pressure behind a closed nozzle or valve. When the valve is opened for a short time, ink emerges as a drop and is propelled by the pressure towards the print surface or substrate. Drops are, therefore, only produced as required in what is known as Drop-on-Demand printing.

Prints produced using these methods must be durable, as well as having good adhesive and rub resistance properties. Such inks are commonly used on high speed beverage lines due to their fast dry time and their ability to produce legible marks on curved surfaces.

It is also desirable for such a formulation to have good thermal stability properties so that the physical properties (such as viscosity and particle size) do not change significantly either during the storage of ink or during operation in the printer. This thermal stability (in both hot and cold environments) is required to ensure reliable printer running so that acceptable print quality and on-substrate performance in all customer environments can be assured.

It is common for substrates used within the beverage industry to have a layer of condensation on their surface due to chilled products being filled in humid environments. As well as providing a legible and durable mark onto such surfaces the codes must also survive immersion in cold water (if the product is chilled) as well as exposure to humid environments (both hot and cold). However in regions where bottles are reused the print must be easily removed through a caustic wash process. Products which are to be marked with such an ink may be a variety of colours; therefore for a mark to be visible the use of an opaque colour may be desirable.

Although titanium dioxide is commonly used in inkjet formulations to provide a high level of opacity, the settling and abrasive nature associated with this pigment can lead to reliability issues in an inkjet printer. Settling and abrasion resistance have been considered in WO00/63305 through the use of orange pigments to achieve a coloured code with high opacity. However, the performance of the inks described within WO00/63305 on wet surfaces is poor and not suitable for use in a chilled beverage line. US2005/0090579 pertains to an opaque inkjet ink for marking onto dark coloured substrates such as returnable glass bottles through the use of pigments. In particular, this document describes the use of opaque organic pigments in conjunction with acidic, acrylic resins and polyamines. Although the problem of providing visible codes with good adhesion onto dark glass substrates is addressed, there is no mention of how to provide an ink that is stable with respect to the settling and abrasion issues outlined above.

The use of a polyamine in conjunction with an acidic resin and hollow microspheres for producing an ink suitable for marking substrates where the code may be subjected to humid environments and/or ice water or condensation is outlined in U.S. Pat. No. 5,596,027. The microspheres are also exemplified as opacifying agents. U.S. Pat. No. 5,596,027 does not describe methods which would enable its ink to have the fast dry times required in beverage production sites. The production of fast drying inkjet compositions based on polyamines, acidic resins and organic solvents is taught in WO99/43760. Although both dye-based and pigment-based colorants are considered, there is no teaching on how to achieve a coloured code with high opacity.

Other approaches to achieve good adhesion onto glass substrates (with and without a layer of condensation) as well as good water resistance have been described in the art. U.S. Pat. No. 5,693,127 seeks to solve the issue through the use of an alkoxysilane polyalkylene imine glass adhesion promoter in conjunction with an acrylic binder. U.S. Pat. No. 5,744,519 describes the use of epoxy resins with a hydroxyl or carboxyl functional polymer. The use of a flexible thermoplastic polyurethane is described in U.S. Pat. No. 5,652,286.

Accordingly, it would be desirable to provide an improved or comparable inkjet ink. In particular it would be desirable to provide a more or a comparably thermally stable inkjet ink which is suitable for producing durable codes on articles during processes commonly used within the beverage industry.

It is one object of the present invention to overcome or address the problems of prior art inks or to at least provide commercially useful alternatives thereto. It is an alternative and/or additional object to provide an inkjet ink which is more thermally stable and/or more adhesive and/or faster drying than known inkjet inks.

SUMMARY OF THE INVENTION

In the first aspect of the present invention there is provided an inkjet ink comprising: a colorant; a first resin; a second resin; an aminosilane; and an organic solvent; wherein the second resin is a styrene maleic anhydride and the second resin is different to the first resin.

The present inventors have surprisingly found that incorporation of a first resin, a styrene maleic anhydride, and an aminosilane in an inkjet ink provides a thermally stable ink, which may have high opacity and may not require the use of titanium dioxide as a pigment. This ink is therefore suitable for marking articles commonly used in industries such as the beverage industry. For example, the ink may be particularly suitable for marking substrates having condensation thereon and/or for use on returnable glass bottles where a code must be removed to enable reuse of the bottle.

The present invention will now be further described. In the following passages different aspects of the invention are defined in more detail. Each aspect so defined may be combined with any other aspect or aspects unless clearly indicated to the contrary. In particular any feature indicated as being preferred or advantageous may be combined with any other feature or features indicated as being preferred or advantageous.

In a further aspect of the present invention there is provided a cartridge comprising the ink as described herein.

In a further aspect of the present invention there is provided a method of printing an ink onto an article, the method comprising: providing the ink as described herein; and inkjet printing the ink onto at least a portion of a surface of the article.

In a further aspect of the present invention there is provided a method of producing the ink as described herein, the method comprising mixing in an organic solvent: a colorant; a first resin; a second resin; an aminosilane; and optionally, a salt; wherein the second resin is a styrene maleic anhydride and the second resin is different to the first resin.

Other preferred embodiments of the device and methods according to the invention appear throughout the specification and in particular in the examples.

DETAILED DESCRIPTION OF THE INVENTION

Unless otherwise defined herein, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition.

As used herein, the term "organofunctional aminosilane" refers to a silicon-based molecule functionalised with an amino group separated from the silicon atom with an organic spacer of varying carbon length.

As used herein, the term "styrene maleic anhydride" is a copolymer made from styrene and maleic anhydride monomers and includes polymers such as partial mono esters of styrene maleic anhydride resin.

In one embodiment of the present invention, there is provided an inkjet ink comprising: a colorant; a first resin; a second resin; an aminosilane; and an organic solvent; wherein the second resin is a styrene maleic anhydride and the second resin is different to the first resin.

Substrates used within the beverage industry may have condensation on their surface due to chilled products being filled in humid environments. The condensation may form before or after the substrate needs to have a mark printed thereon. Specialised inks are therefore required if a mark is to be printed onto the substrate, dry quickly, and remain legible for the required period of time, during which time the substrate may be subjected to (further) humid atmospheres or submerged in a hot or cold liquid such as water. Such inks must also comply with certain industry standards, and may need to be easily removed through the use of a caustic wash so that the substrate can be reused. Prior art methods of printing onto substrates in hot or cold, humid atmospheres and/or where the print must be durable but removable with good caustic washability include the use of acidic, acrylic resins and polyamines; acidic resins and hollow microspheres; polyamines, acidic resins and organic solvents; alkoxysilane polyalkylene imine glass adhesion promoter with acrylic binders; epoxy resins with a hydroxyl or carboxyl functional polymer; or a flexible thermoplastic polyurethane. The disadvantages of these inks are discussed above.

To address these problems, the present inventors have now surprisingly found that the incorporation of a first resin, a styrene maleic anhydride, and an aminosilane in an inkjet ink provides a thermally stable ink suitable for use in hot or cold, humid environments on substrates such as glass and plastic. Due to its high thermal stability, the ink is easily stored without causing problems during the inkjet ink printing process. For example, properties such as the ink's viscosity, filtration time and particle size remain largely constant. Additionally, the inks may have high opacity and may not require the use of titanium dioxide as a pigment. When printed, the inks are fast-drying and provide a durable and/or legible mark with good rub resistance, water immersion resistance and refrigeration resistance. The inks also exhibit good caustic washability.

The ink of the present invention comprises a colorant. Any suitable colorant can be used. Colorants suitable for use in the present invention include pigments, dyes, and combinations thereof. Suitable dyes include but are not limited to CI Solvent Yellow 79, CI Solvent Yellow 83:1, CI Solvent Yellow 29, CI Solvent Yellow 79, CI Solvent Yellow 81, CI Solvent Yellow 82, CI Solvent Yellow 151, CI Solvent Blue 44, CI Solvent Blue 70, CI Solvent Blue 45, CI Solvent Blue 67, CI Solvent Blue 5, CI Solvent Blue 136, CI Solvent Blue 15, CI Solvent Red 8, CI Solvent Red 18, CI Solvent Red 68, CI Solvent Red 89, CI Solvent Red 91, CI Solvent Red 119, CI Solvent Red 112, CI Solvent Red 122, CI Solvent Red 118, CI Solvent Red 125, CI Solvent Red 130, CI Solvent Red 132, CI Solvent Red 160, CI Solvent Red 233, CI Solvent Black 3, CI Solvent Black 27, CI Solvent Black 28, CI Solvent Black 29 and combinations of one or more thereof.

In some embodiments, the colorant is a pigment. More preferably, the pigment is an opaque pigment. Any suitable opaque pigment can be used.

In some embodiments, to provide opacity, the pigment should have an appropriate average particle size to be able to scatter visible light. Accordingly, in some embodiments, the average particle size of the opaque pigment is in the range of from about 0.1 µm to about 1.0 µm, more preferably from about 0.1 µm to about 0.8 µm, or from about 0.1 µm to about 0.6 µm, or from about 0.1 µm to about 0.5 µm, most preferably from about 0.1 µm to about 0.4 µm.

Average particle sizes may be measured using a Zetasizer Nano ZS particle sizer (for example, by diluting the concentrated ink by a factor of 3 in methyl ethyl ketone).

In some embodiments, the pigment is an organic or an inorganic pigment. Suitable inorganic pigments include titanium dioxide and carbon black.

In some embodiments, the pigment is an organic pigment, more preferably an opaque, organic pigment. Suitable opaque, organic pigments include CI Pigment Red 176, CI Pigment Red 254, CI Pigment Red 255, CI Pigment Red 272, CI Pigment Red 254, CI Pigment Orange 64, CI Pigment Orange 73, CI Pigment Yellow 83, CI Pigment Yellow 138, CI Pigment Yellow 139, CI Pigment Yellow 151, CI Pigment Yellow 154, CI Pigment Blue 15:2, CI Pigment Blue 15:3, CI Pigment Blue 15:4, CI Pigment Green 3, CI Pigment Violet 23 and CI Pigment Violet 37. In some embodiments, the pigment is selected from the group consisting of CI Pigment Yellow 139, CI Pigment Red 272, CI Pigment Orange 64 and combinations of one or more thereof. Most preferably, the pigment is CI Pigment Yellow 139.

The colorant is present in any suitable amount. In some embodiments, the colorant is present in an amount of from about 2 to about 25% by weight of the ink. More preferably, the colorant is present in an amount of from about 5 to about 25% by weight of the ink, or from about 10 to about 20% by weight of the ink, or from about 12.5 to about 20% by weight of the ink. More preferably still, the colorant is present in an amount of from about 15 to about 20% by weight of the ink. Most preferably, the colorant is present in an amount of from about 16 to about 18% by weight of the ink.

Additionally, and/or alternatively, in some embodiments, the ink does not contain titanium dioxide and/or carbon black.

In some embodiments, the ink further comprises a salt. Any suitable salt may be used, in some embodiments any salt which is soluble in the ink solvent system which can impart a conductivity greater than 500 $\mu Scm^{-1}$, or 550 $\mu Scm^{-1}$, or, in some embodiments, greater than 600 $\mu Scm^{-1}$.

More preferably, the salt is one or more hydrophobic conductive agents. Hydrophobic conductive agents have no or low solubility in water, for example, a solubility in water of about 0.5% by weight or less at 25° C., and in some embodiments a solubility of about 0.1% by weight or less at 25° C. Any suitable hydrophobic conductive agent can be used. Examples of hydrophobic conductive agents include ammonium or phosphonium salts, and borate and phosphate salts. In some embodiments, the hydrophobic conductive agent comprises a cation selected from the group consisting of tetraalkylammonium, tetraarylammonium, tetraalkylphosphonium, tetraarylphosphonium, and any combinations thereof, and an anion selected from the group consisting of hexafluorophosphate, tetrafluoroborate, tetraalkylborate, tetraarylborate, and any combinations thereof.

Suitable salts include tetrabutylammonium hexafluorophosphate, tetrapropylammonium hexafluorophosphate, tetraethylammonium hexafluorophosphate, tetramethylammonium hexafluorophosphate, tetrabutylammonium tetraphenylborate, tetrabutylammonium tetrabutylborate, tetrabutylammonium tetrafluoroborate, tetrapropylammonium tetrafluoroborate, tetraethylammonium tetrafluoroborate, tetramethylammonium tetrafluoroborate, tetrabutylammonium bromide, tetraethylammonium chloride, tetrabutylammonium nitrate, tetrabutylammonium acetate, lithium triflate, potassium thiocyanate, potassium hexafluorophosphate, and any combinations thereof.

In some embodiments, the salt is selected from the group consisting of tetrabutylammonium bromide, tetraethylammonium chloride, tetrabutylammonium nitrate, tetrabutylammonium acetate, lithium triflate, potassium thiocyanate, potassium hexafluorophosaphate, tetrabutylammonium hexafluorophosphate and combinations of one or more thereof. Most preferably, the salt is tetrabutylammonium hexafluorophosphate (TBAF$_6$).

The salt, if present, can be present in any suitable amount. In some embodiments, the salt is present in an amount of from 0 to about 5% by weight of the ink. More preferably, the salt is present in an amount of from about 0.1 to about 5% by weight of the ink, or from about 0.5 to about 3% by weight of the ink, or from about 1 to about 2.5% by weight of the ink. Most preferably, the salt is present in an amount of from about 1.5 to about 2% by weight of the ink.

Without wishing to be bound by theory, it is thought that such salts in the amounts described may assist in enabling the selective charging and deflection of ink droplets within the inkjet stream.

In one embodiment, the inkjet ink is a valve jet inkjet ink. When the ink jet ink is a valve jet inkjet ink, in some embodiments, the ink does not contain a salt, The ink comprises a first resin. The first resin is different to the second resin, i.e. the first resin does not have the same chemical make-up as the second resin. In particular, the first resin is not a styrene maleic anhydride. The first resin may be soluble or dispersible in the organic solvent. The first resin may be an acidic resin and/or a non-acidic resin. Suitable non-acidic resins include polyvinyl butyral, polyvinyl chloride, polyvinylidene dichloride, cellulose acetate butyrate, cellulose acetate propionate, cellulose nitrate, polyester, polyketone, polyurethane, polyamide, polymethylmethacrylate, polyethylmethacrylate, polybutylmethacrylate, polyisobutylmethacrylate.

In some embodiments, the first resin is an acidic resin. Any suitable acidic resin, e.g., a polymer having a carboxyl, sulfonic, or phosphonic, preferably, carboxyl, group can be used.

When the first resin is an acidic resin, said acidic resin can have any suitable acid number, for example, an acid number of from about 60 to about 250, in some embodiments, from about 60 to about 200, mg of KOH/g of the resin. More preferably, the acidic resin has an acid number of from about 75 to about 150, or from about 90 to about 130 mg of KOH/g of the resin. Most preferably, the acidic resin has an acid number of from about 100 to about 120 mg of KOH/g of the resin.

Acidic resins can be prepared by methods generally known in the art, for example, by polymerizing a monomer or a mixture of monomers using a suitable catalyst. The mixture of monomers can include only acidic monomers or one or more acidic monomers and one or more non-acidic (neutral) monomers. For example, a mixture of styrene and acrylic acid can be polymerized using a redox catalyst such as ammonium persulfate-hydrogen peroxide or Fenton's reagent (ferrous sulfate-hydrogen peroxide). The number of acidic (e.g., carboxyl) groups can be adjusted by controlling the relative amount of the monomers in the monomer mixture. Alternatively, acidic resins can be generated from resins having ester functionality.

In some embodiments, the acidic resin is an acrylic resin. Acrylic resins are known in the art. The acrylic resin may be a homopolymer or a copolymer. In some embodiments, the acrylic resin is a styrene acrylic copolymer, more preferably one or more of styrene acrylic MMA/BMA copolymer and styrene acrylic MMA/EMA copolymer. For example, one particularly preferably acrylic resin is JONCRYL® 586.

In some embodiments, the first resin has a weight average molecular weight (Mw) of from about 1,000 to about 100,000, more preferably of from about 1,000 to about 75,000, or from about 1,000 to about 60,000, or from about 1,500 to about 50,000. More preferably still, the first resin has a weight average molecular weight (Mw) of from about 1,500 to about 30,000, or from about 1,500 to about 25,000, or from about 1,500 to about 20,000, or from about 2,000 to about 15,000, or from about 2,500 to about 10,000, or from about 3,000 to about 8,000, or from about 3,500 to about 7,000. Most preferably, the first resin has a weight average molecular weight (Mw) of from about 4,000 to about 5,000.

The first resin can be used in any suitable amount, for example, when the first resin is an acid resin, in an amount suitable to provide a residual acid function. In some embodiments, the first resin is present in an amount of from about 2.5 to about 25% by weight of the ink. More preferably, the first resin is present in an amount of from about 5 to about 25% by weight of the ink, or from about 10 to about 25% by weight of the ink, or from about 12.5 to about 25% by weight of the ink, or from about 15 to about 25% by weight of the ink, or from about 17.5 to about 25% by weight of the ink, or from about 18 to about 24% by weight of the ink, or from about 19 to about 23% by weight of the ink. Most preferably, the first resin is present in an amount of from about 21 to about 22% by weight of the ink.

Without wishing to be bound by theory, it is thought that such first resins in the amounts described may assist in achieving both reliable in-printer performance and, when used in conjunction with the aminosilane, good durability on wet and dry substrates, such as wet and dry glass or plastic substrates.

Alternatively, in some embodiments, when the inkjet ink is a valve jet inkjet ink, the first resin is present in an amount of from about 2.5 to about 25% by weight of the ink. More preferably, the first resin is present in an amount of from about 5 to about 25% by weight of the ink, or from about 10 to about 20% by weight of the ink, or from about 11 to about 16% by weight of the ink, or from about 12 to about 15% by weight of the ink. Most preferably, the first resin is present in an amount of from about 13 to about 14% by weight of the ink.

The ink comprises a second resin, the second resin being a styrene maleic anhydride. The second resin is different to the first resin, i.e. the second resin does not have the same chemical make-up as the first resin.

Styrene maleic anhydrides are known in the art and any suitable styrene maleic anhydride may be used. The second resin (the styrene maleic anhydride) may be soluble or dispersible in the organic solvent. In some embodiments, the styrene maleic anhydride is a partial mono ester of styrene maleic anhydride.

The second resin (the styrene maleic anhydride) can have any suitable acid number, for example, an acid number of from about 50 to about 250, in some embodiments, from about 100 to about 250, mg of KOH/g of the resin. More preferably, the second resin has an acid number of from about 125 to about 225 mg of KOH/g of the resin. Most preferably, the second resin has an acid number of from about 150 to about 200 mg of KOH/g of the resin.

In some embodiments, the second resin has a weight average molecular weight (Mw) of about 2,000 to about 20,000. More preferably, the second resin has a weight average molecular weight (Mw) of about 2,000 to about 15,000, or from about 2,000 to about 15,000, or from about 2,000 to about 12,000, or from about 3,000 to about 11,000, or from about 4,000 to about 10,000, or from about 5,000 to about 9,000, or from about 6,000 to about 8,000. Most preferably, the second resin has a weight average molecular weight (Mw) of about 6,500 to about 7,500.

In some embodiments, the second resin is present in an amount of from about 0.5 to about 10% by weight of the ink. More preferably, the second resin is present in an amount of from about 0.5 to about 9% by weight of the ink, or from about 0.5 to about 8% by weight of the ink, or from about 0.5 to about 7% by weight of the ink, or from about 0.5 to about 6% by weight of the ink, or from about 0.5 to about 5% by weight of the ink, or from about 1 to about 4% by weight of the ink, or from about 1 to about 3% by weight of the ink. Most preferably, the second resin is present in an amount of from about 1.5 to about 2.5% by weight of the ink.

Without wishing to be bound by theory, it is thought that such a second resin (styrene maleic anhydride) in the amount described promotes compatibility and stability between the first resin, aminosilane and colorant, whilst maintaining in the ink important properties such as caustic washability.

Alternatively, in some embodiments, when the inkjet ink is a valve jet inkjet ink, the second resin is present in an amount of from about 0.5 to about 10% by weight of the ink. More preferably, the second resin is present in an amount of from about 0.5 to about 8% by weight of the ink, or from about 0.5 to about 5% by weight of the ink, or from about 0.5 to about 3% by weight of the ink, or from about 0.5 to about 2% by weight of the ink. Most preferably, the second resin is present in an amount of from about 1.0 to about 1.5% by weight of the ink.

The ink comprises an aminosilane. Aminosilanes are well known in the art and any suitable aminosilane may be used. In some embodiments, the aminosilane is an organofunctional aminosilane. In some embodiments, the aminosilane is selected from the group consisting of 3-aminopropyl trimethoxysilane, diamino trimethoxysilane, triamino trimethoxysilane, dipodalamino trimethoxysilane, oligomeric alkylaminosilane and mixtures of two or more thereof. More preferably, the aminosilane is selected from the group consisting of an alkylaminosilane oligomer, a triamino trimethoxysilane and combinations thereof.

In some embodiments, the aminosilane is present in an amount of from about 0.25 to about 5% by weight of the ink. More preferably, the aminosilane is present in an amount of from about 0.25 to about 2.5%, or from about 0.25 to about 2%, or from about 0.25 to about 1.5% by weight of the ink. Most preferably, the aminosilane is present in an amount of from about 0.5 to about 1% by weight of the ink.

Without wishing to be bound by theory, it is thought that aminosilanes, for example organofunctional aminosilanes, in the amounts specified, may assist in promoting the adhesion of the ink on substrates such as wet glass and plastic.

Alternatively, in some embodiments, when the inkjet ink is a valve jet inkjet ink, the aminosilane is present in an amount of from about 0.1 to about 5% by weight of the ink. More preferably, the aminosilane is present in an amount of from about 0.1 to about 2.5%, or from about 0.1 to about 1.0%, or from about 0.1 to about 0.5% by weight of the ink. Most preferably, the aminosilane is present in an amount of from about 0.2 to about 0.4% by weight of the ink.

The ink comprises an organic solvent. Organic solvents are known in the art and any suitable organic solvent can be used as the ink carrier. In some embodiments, an organic solvent that has a low boiling point and/or a mixture of such solvents is used as the main ink carrier. Small amounts of high boiling solvents can also be employed in combination with the low boiling solvent(s). Examples of suitable organic solvents include ketones, such as acetone, methyl ethyl ketone (MEK), diethyl ketone, methyl isobutyl ketone, and cyclohexanone; esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, and methoxypropyl acetate; alcohols such as methanol, ethanol, n-propanol, isopropanol, n-butanol, t-butanol, n-pentanol, and n-hexanol; glycols such as ethylene glycol, propylene glycol, glycerin, and diethylene glycol; glycol ethers such as methoxypropanol, ethylene glycol dimethyl ether, ethylene glycol diethylether, cellosolve, diethyleneglycol dimethylether, and diethylene glycol diethylether; and amides, as well as mixtures of two or more of the foregoing. More preferably, the organic solvent is selected from the group consisting of acetone, methyl ethyl ketone, methyl propyl ketone, methyl isobutyl ketone, cyclohexanone, ethanol, n-butanol, n-propanol, isopropanol, methyl acetate, ethyl acetate, butyl acetate, propyl acetate, hexyl acetate, dimethyl carbonate, isobutyl butyrate and combinations of one or more thereof. More preferably still, the organic solvent is a ketone. Most preferably, the organic solvent is methyl ethyl ketone.

Any suitable amount of organic solvent or mixture of organic solvents, including co-solvents, can be present in the ink. In some embodiments, the organic solvent is present in an amount of from about 30 to about 94.75% by weight of the ink, more preferably from about 50 to about 94.75% by weight of the ink, or from about 50 to about 90% by weight of the ink or from about 50 to about 80% by weight of the ink, or from about 50 to about 70% by weight of the ink. Most preferably, the organic solvent is present in an amount of from about 50 to about 60% by weight of the ink. Alternatively, in some embodiments, the organic solvent makes up the balance to 100 weight %.

Alternatively, in some embodiments, when the inkjet ink is a valve jet inkjet ink, the organic solvent is present in an amount of from about 30 to about 94.75% by weight of the ink, more preferably from about 50 to about 94.75% by weight of the ink, or from about 60 to about 90% by weight of the ink or from about 60 to about 80% by weight of the ink, or from about 60 to about 75% by weight of the ink. Most preferably, the organic solvent is present in an amount of from about 65 to about 70% by weight of the ink. Alternatively, in some embodiments, the organic solvent makes up the balance to 100 weight %.

The inkjet ink of the present invention can optionally include a co-solvent. For example, methyl ethyl ketone can be used in combination with a co-solvent, e.g., methoxypropyl acetate or ethanol. If a co-solvent is used, it is used in an amount smaller than the main solvent. For example, the main solvent is used in an amount of about two, three, four, five, or more times the amount of the co-solvent. If methyl ethyl ketone is the main organic solvent, for example, ethanol can be used as the co-solvent.

The ink may also comprise one or more (further) conductivity agent, one or more other additive and one or more other colorants. For example, the inkjet ink as described herein can also include one, two, three, or more additives, for example, a humectant, a defoamer, an adhesion promoter, a plasticizer, a dispersing agent, and/or a surfactant.

The ink may comprise a humectant to prevent drying of the ink on the print head during printing, as well as during storage of the ink. Humectants are typically hydrophilic solvents having high boiling points, in some embodiments, above 100° C., and more preferably from 150° C. to 250° C. Any suitable humectant known to in the art can be used. Examples of suitable humectants include glycols such as ethylene glycol, propylene glycol, glycerin, diglycerin, and diethylene glycol; glycol ethers such as ethylene glycol dimethyl ether, ethylene glycol diethylether, propyleneglycol methylether, cellosolve, diethylene glycol monoethylether (Carbitol), diethylene glycol dimethylether, and diethylene glycol diethylether; dialkyl sulfoxides such as dimethyl sulfoxide, and other solvents such as sulfolane and N-methylpyrrolidone. The humectant may be present in an amount of from about 0 to about 10% by weight of the ink, or from about 0.1 to about 8% by weight of the ink, and in some embodiments from about 1 to about 5% by weight of the ink.

The ink may comprise a defoamer to prevent foaming of the ink during its preparation, as well as during printing. Any suitable defoamer, for example, polysiloxane defoamers can be used. The defoamer may be present in any suitable amount, for example, in an amount of from 0 to about 1% by weight of the ink, or from about 0.01 to about 0.8% by weight of the ink, and in some embodiments, in an amount of from about 0.1% to about 0.5% by weight of the ink.

The ink may also comprise a suitable adhesion promoter, e.g., a further silane, to further improve the adhesion of the printed mark to glass substrates, for example. An example of a suitable silane is 3-glycidoxy-propylmethyl-dimethoxysilane. The adhesion promoter may be present in any suitable amount, for example, from 0 to about 3% by weight of the ink, or from about 0.01 to about 2.5% by weight of the ink, and in some embodiments, in an amount of from about 0.1 to about 2% by weight of the ink, and more preferably in an amount of from about 0.25 to about 1.5% by weight of the ink.

The ink may also include a plasticizer to further enhance the properties, e.g., durability, of the printed mark. Any suitable plasticizer can be used. For example, Rit-Cizer 8, which is an o,p-mixture of N-ethyltoluenesulfonamide available from Rit-Chem Co., may be used. The plasticizer may be present in any suitable amount, for example, in an amount of from 0 to about 3% by weight of the ink, or from about 0.01 to about 2.5% by weight of the ink, and in some embodiments, in an amount of from about 0.1 to about 2% by weight of the ink, and more preferably in an amount of from about 0.5 to about 1.5% by weight of the ink.

The ink may further include a surfactant to optimize the wetting and/or drying characteristics of the ink. Any suitable surfactant can be employed, for example, fluoroaliphatic polymeric esters and polyalkylene oxide modified polydimethylsiloxanes. Examples of suitable surfactants include SILWET® L-7622, which is a polyethyleneoxide modified polydimethylsiloxane, available from OSi Specialties, Inc. in Danbury, Conn., and FC 430, which is a fluoroaliphatic polymeric ester, available from 3M Co. The surfactant may be present in the ink composition in any suitable amount, for example, in an amount of from 0 to about 2% by weight of the ink, or from about 0.01 to about 1% by weight of the ink, and in some embodiments, in an amount of from about 0.05 to about 0.5% by weight of the ink.

The ink may also include a dispersing agent, for example, a polymeric dispersing agent, to enhance pigment stabilization or reduce sedimentation rate. Hyperdispersants, which are polymeric dispersing agents containing groups with affinity for pigments, can be employed. An example of a hyperdispersant is SOLSPERSE® 38500, available from Avecia in Wilmington, Del. Other examples of hyperdispersants are known in the art, for example, see WO00/63305. The dispersing agent may be used in any suitable amount, for example, in an amount of from 0 to about 5% by weight of the ink, or from about 0.1 to about 3% by weight of the ink, and in some embodiments, in an amount of from about 0.5 to about 2% by weight of the ink.

In some embodiments, the ink has a viscosity of from about 2 to about 10 cP, or from about 2.5 to about 8 cP, or from about 3 to about 6 cP, at 25° C. More preferably, the ink has a viscosity of from about 3.5 to about 5.5 cP, at 25° C. The viscosity of the ink may be measured using a viscometer such as a Brookfield DV-II+ viscometer or a rheometer.

In some embodiments, the ink has a conductivity (o) of more than about 500 µS/cm, or of more than about 550 µS/cm, more preferably of more than about 600 µS/cm. Alternatively, in some embodiments, the ink has a conductivity (o) of from about 500 µS/cm to about 5,000 µS/cm, or of from about 550 µS/cm to about 3,000 µS/cm, or of from about 600 µS/cm to about 2,000 µS/cm, or of from about 650 µS/cm to about 1,800 µS/cm. The conductivity of the ink may be measured, for example, using a BA 380 conductivity meter, available from EDT Instruments.

Providing an ink with the above viscosity and/or conductivity is advantageous because these properties are particularly favourable for use in continuous inkjet technologies.

Alternatively, in some embodiments, when the inkjet ink is a valve jet inkjet ink, the ink has a viscosity of from about 0.1 to about 2 cP, or from about 0.5 to about 2 cP, or from about 1 to about 2 cP, at 25° C. More preferably, the ink has a viscosity of from about 1.5 to about 1.8 cP, at 25° C. In some embodiments, when the inkjet ink is a valve jet inkjet ink, the surface tension of the ink is more than about 20 dynes·cm$^{-1}$. Providing an ink with the above viscosity and/or surface tension is advantageous because these properties are particularly favourable for use in valve jet inkjet ink technologies, specifically regarding governing the jetting of the ink through the nozzle.

In some embodiments, when the inkjet ink is a valve jet inkjet ink, ink has a conductivity (o) of from about 10 mS/cm to about 1,000 mS/cm, or of from about 10 mS/cm to about 500 mS/cm, or of from about 20 mS/cm to about 200 mS/cm, or of from about 30 mS/cm to about 100 mS/cm. More preferably, the ink has a conductivity (o) of from about 30 mS/cm to about 50 mS/cm.

Alternatively, in one embodiment of the present invention, there is provided an inkjet ink consisting essentially of, or consisting of: a colorant; a first resin; a second resin; an aminosilane; an organic solvent; and optionally, a salt; wherein the second resin is a styrene maleic anhydride and the second resin is different to the first resin.

In some embodiments, the inkjet ink comprises, consists essentially of, or consists of: a colorant, in an amount of from about 2 to about 25%; a first resin, in an amount of from about 2.5 to about 25%; a second resin, in an amount of from about 0.5 to about 10%; an aminosilane, in an amount of from about 0.25 to about 5%; an organic solvent, in an amount of from about 94.75 to about 30%; and optionally, a salt, in an amount of from about 0 to about 5%; wherein the second resin is a styrene maleic anhydride and the second resin is different to the first resin.

In one embodiment of the present invention, there is provided a cartridge comprising the ink as described herein.

In one embodiment of the present invention, there is provided a deposit comprising the ink as described herein.

In one embodiment of the present invention, there is provided an article comprising the deposit as described herein.

In some embodiments, the article comprises drink packaging and/or food packaging.

In one embodiment of the present invention, there is provided a method of printing an ink onto an article, the method comprising: providing the ink as described herein; and inkjet printing the ink onto at least a portion of a surface of an article.

In a further embodiment of the present invention, there is provided a method of valve jet printing an ink onto an article, the method comprising: providing the ink as described herein; and valve jet inkjet printing the ink onto at least a portion of a surface of an article.

The at least a portion of the surface may or may not have condensation thereon, i.e. the ink as described herein is effective at suitably marking either a dry or a wet substrate or article. In one preferable embodiment, the at least a portion of the surface of the article has condensation thereon.

The method may be applied to any suitable article. Examples of suitable articles include articles comprising glass, metal, a laminate, ceramic, plastic, cardboard, and/or paper. Plastics, laminates, metals, glass, and ceramic articles may be in any suitable form such as in the form of bottles or containers, plates, rods, cylinders, etc. In some embodiments, the article comprises glass, for example soda-lime glass, borosilicate glass, alumino-silicate glass, lead glass, and borate glass. The glass may contain a coating thereon or may be free of a coating.

In one preferable embodiment, the article comprises drink packaging and/or food packaging. More preferably, the article comprises a glass bottle or a plastic bottle, more preferably a glass bottle.

In another preferable embodiment, the article comprises a cable, a wire or a component of an electronic device, for example a battery case, a printed circuit board (PCB) or a display screen.

The ink jet ink composition as described herein can be prepared by combining the required ingredients and mixing them in a suitable mixing device, for example, a blender. The resulting product can be filtered.

In one embodiment of the present invention, there is provided a method of producing the ink as described herein, the method comprising mixing in an organic solvent: a colorant; a first resin; a second resin; an aminosilane; and optionally, a salt; wherein the second resin is a styrene maleic anhydride and the second resin is different to the first resin.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The following non-limiting examples further illustrate the present invention.

EXAMPLES

Test Methods

Print samples were created using a Domino A-Series+ print sample rig fitted with either a 60 or 75 μm nozzle. Taken on a range of glass bottles commonly used for bottling soft drinks and beer.

The rub resistance of the code on wet glass was assessed on a range of different types of glass bottles with a layer of condensation. To produce the wet surface thin layers of condensation were deposited by storing the substrate in the freezer for 20 minutes so that a thin layer of moisture was formed on the surface when they were removed. Print samples were produced immediately after removal from the freezer and allowed to dry for three seconds before the durability of the code was assessed by rubbing with a finger and scored using the criteria in Table 1.

The ability of the code to be removed by a caustic wash solution was determined using a 5% solution of Johnson Diversry Spectak G (diluted in DI water) which was heated to 74° C. The printed samples were immersed in the solution for 5 minutes, rinsed thoroughly under the tap, assessed visually for code removal and scored using the criteria in Table 1.

To assess the resistance of the code to immersion in water the printed codes were submerged for 1 hour in deionised water before performing the rub resistance test and scored using the criteria in Table 1.

To determine the refrigeration resistance print samples on the glass bottles were stored in the fridge for both 1 hour and 1 day. The rub resistance of the code was assessed immediately after removal from the fridge and scored using the criteria in Table 1.

TABLE 1

Scoring system to assess the code performance

| Measurement | Rating (score) | | | | |
|---|---|---|---|---|---|
| | Very poor | Poor | Moderate | Good | Excellent |
| Caustic wash | Code untouched | Small amount of code removed | Faint but visible code | Very faint code | All code removed |
| Number of finger rubs | 1 | 2-4 | 5-7 | 8-10 | >10 |

The viscosity, filtration time and particle size of the ink samples were measured to demonstrate thermal stability. Viscosity was measured using the Brookfield DV-E viscometer fitted with a UL adaptor at 25° C., filtration time by measuring the length of time it takes to filter 15 mL of ink through a 1 µm glass fibre filter and the particle size using the Zetasizer Nano ZS particle sizer (diluting the concentrated ink by a factor of 3 in MEK). The properties of the ink were measured initially after preparation and after storage at 60° C.

Example 1

Formulation 1, shown in Table 2, is an example of a thermally stable inkjet ink which contains the combination of a styrene acrylic co-polymer (Joncryl® 586), an organofunctional aminosilane (Dynasylan triamo) and a partial mono ester of styrene maleic anhydride (SMA® 1440F) and has good durability, water resistance and caustic washability on glass substrates. Thermal stability of the ink is demonstrated in Table 3 and performance on glass substrates in Table 4.

TABLE 2

Formulation 1

| Material | Amount (wt %) |
|---|---|
| MEK (methyl ethyl ketone) | 58 |
| Joncryl$^{(RTM)}$ 586 | 21 |
| Dynasylan Triamo | 0.5 |
| SMA$^{(RTM)}$ 1440F | 2 |
| TBAPF$_6$ | 1.5 |
| PY139 yellow dispersion | 17 |

TABLE 3

Viscosity, filtration time and particle size data of formulation 1 after storage at 60° C.

| Formulation | Weeks | Storage temperature (° C.) | Viscosity at 25° C. (cP) | Filtration time (s) | Particle size (nm) | |
|---|---|---|---|---|---|---|
| | | | | | $Z_{ave}$ | $D_{50}$ |
| 1 | Initial | n/a | 4.06 | 32 | 219.7 | 201 |
| | 2 | 60 | 3.71 | 31 | 182.9 | 202 |
| | 4 | 60 | 3.70 | 49 | 181.5 | 205 |
| | 6 | 60 | 3.72 | 32 | 187.7 | 199 |
| | 12 | 60 | 3.74 | 36 | 181.6 | 201 |

TABLE 4

Performance of Formulation 1 on different glass substrates

| Bottle type | Initial rub resistance | Water immersion | Caustic wash | Refrigeration test 1 h | Refrigeration test 1 day |
|---|---|---|---|---|---|
| 1 Brown beer | Excellent | Excellent | Excellent | Excellent | Excellent |
| 2 Tall brown beer | Excellent | Excellent | Excellent | Excellent | Excellent |
| 3 Tall Green | Excellent | Excellent | Excellent | Excellent | Excellent |
| 4 Sprite green | Excellent | Excellent | Good | Excellent | Excellent |
| 5 7up green | Excellent | Excellent | Excellent | Excellent | Excellent |

As shown in Table 3 the viscosity, filtration time and particle size of formulation 1, after an initial decrease (which is thought to be linked to an increase in the solubility of materials), remains stable over a 12 week period with no significant change in any of the properties measured.

The rub resistance, caustic washability, water immersion resistance and refrigeration resistance of formulation 1 were measured on 5 different substrates and are presented in Table 4. Good to excellent performance was seen on all substrates in all tests.

Examples 2-5

Formulations 2-5 are used as examples of the SMA resin stabilising the ink properties upon storage at high temperatures. The formulation details are shown in Table 5 and the physical properties measured after storage at 60° C. are shown in Table 6.

TABLE 5

Formulations 2-5

| | Amount (wt %) Formulation | | | |
|---|---|---|---|---|
| Material | 2 | 3 | 4 | 5 |
| MEK | 58 | 56.05 | 53.2 | 55.1 |
| Isopropanol | 0 | 0 | 0 | 2.9 |
| Ethanol | 0 | 2.95 | 2.8 | 0 |
| Joncryl$^{(RTM)}$ 586 | 22 | 22 | 22 | 22 |
| Dynasylan 1146 | 1 | 0 | 1 | 1 |
| SMA$^{(RTM)}$ 1440F | 0 | 0 | 2 | 0 |
| TBAPF$_6$ | 2 | 2 | 2 | 2 |
| PY139 yellow dispersion | 17 | 17 | 17 | 17 |

TABLE 6

Viscosity, filtration time and particle size data of formulations 2-5 after storage at 60° C.

| Formu-lation | Weeks | Storage temperature (° C.) | Viscosity at 25° C. (cP) | Filtration time (s) | Particle size (nm) $Z_{ave}$ | $D_{50}$ |
|---|---|---|---|---|---|---|
| 2 | Initial | n/a | 4.84 | 40 | 208.5 | 231 |
|   | 1 | 60 | 8.44 | blocked | 244.3 | 283 |
| 3 | Initial | n/a | 3.55 | 28 | 201.8 | 223 |
|   | 1 | 60 | 3.28 | 30 | 185.3 | 208 |
|   | 2 | 60 | 3.33 | 24 | 188 | 209 |
|   | 4 | 60 | 3.43 | 51 | 187 | 208 |
|   | 8 | 60 | 4.29 | blocked | 210.5 | 240 |
| 4 | Initial | n/a | 5.46 | 42 | 202.5 | 220 |
|   | 1 | 60 | 5.02 | 40 | 187.6 | 212 |
|   | 2 | 60 | 5.08 | 37 | 187.9 | 207 |
|   | 4 | 60 | 5.04 | 52 | 188.6 | 208 |
|   | 8 | 60 | 5.15 | 56 | 189.2 | 209 |
| 5 | Initial | n/a | 4.54 | 35 | 207.9 | 225 |
|   | 1 | 60 | 10.67 | blocked | 294.9 | 357 |

In the formulations which do not contain the styrene maleic anhydride (SMA® 1440F) (Formulations 2, 3 and 5) an undesirable increase in viscosity and particle size is seen as well as blocking of the 1 μm filter during the filtration test, this is indicative of thermal instability within the product. For the formulation containing the SMA resin (Formulation 4) after an initial decrease in viscosity and particle size (as seen in Formulation 1) the properties remain stable on ageing and no evidence of filter blocking was seen with this formulation.

Example 6

Formulation 6, shown in Table 7, is an example of a thermally stable valve jet inkjet ink which contains the combination of a styrene acrylic co-polymer (Joncryl® 586), an organofunctional aminosilane (Dynasylan triamo) and a partial mono ester of styrene maleic anhydride (SMA® 1440F) and has good durability, water resistance and caustic washability on glass substrates. Suitability for thermally stable valve jet inkjet printing is demonstrated in Table 8.

TABLE 7

Formulation 6

| Material | Amount (wt %) |
|---|---|
| MEK (methyl ethyl ketone) | 68.20 |
| Joncryl$^{(RTM)}$ 586 | 13.20 |
| Dynasylan Triamo | 0.30 |
| SMA$^{(RTM)}$ 1440F | 1.30 |
| PY139 yellow dispersion | 17 |

TABLE 8

| Formulation | Viscosity at 25° C. (cP) | Filtration time (s) | Conductivity (mS · cm$^{-1}$) | Reflectance |
|---|---|---|---|---|
| 6 | 1.68 | 18 | 40 | 0.63 |

LIST OF NON-LIMITING EMBODIMENTS

Embodiment A is an inkjet ink comprising a colorant, a first resin, a second resin, an aminosilane; and an organic solvent. The second resin is a styrene maleic anhydride and the second resin is different to the first resin.

The inkjet ink of Embodiment A wherein the colorant is a pigment.

The inkjet ink of Embodiment A or Embodiment A with any of the intervening features wherein the pigment is an opaque pigment.

The inkjet ink of Embodiment A or Embodiment A with any of the intervening features wherein the pigment is an organic pigment.

The inkjet ink of Embodiment A or Embodiment A with any of the intervening features comprises salt.

The inkjet ink of Embodiment A or Embodiment A with any of the intervening features wherein the first resin is an acidic resin.

The inkjet ink of Embodiment A or Embodiment A with any of the intervening features wherein the acidic resin is an acrylic resin.

The inkjet ink of Embodiment A or Embodiment A with any of the intervening features wherein the styrene maleic anhydride is a partial mono ester of styrene maleic anhydride.

The inkjet ink of Embodiment A or Embodiment A with any of the intervening features wherein the second resin is present in an amount of from about 0.5 to about 10% by weight of the ink.

The inkjet ink of Embodiment A or Embodiment A with any of the intervening features wherein the second resin has a weight average molecular weight (Mw) of about 2,000 to about 20,000.

The inkjet ink of Embodiment A or Embodiment A with any of the intervening features wherein the colorant is present in an amount of from 2 to about 25% by weight of ink.

The inkjet ink of Embodiment A or Embodiment A with any of the intervening features wherein the first resin is present in an amount of from about 2.5 to about 25% by weight of ink.

The inkjet ink of Embodiment A or Embodiment A with any of the intervening features wherein the aminosilane is an organofunctional aminosilane.

The inkjet ink of Embodiment A or Embodiment A with any of the intervening features wherein the aminosilane is present in an amount of from about 0.25 to about 5% by weight of ink.

The inkjet ink of Embodiment A or Embodiment A with any of the intervening features wherein the inkjet ink is a valve jet inkjet ink.

The inkjet ink of Embodiment A or Embodiment A with any of the intervening features wherein a cartridge comprising the ink of claim 23.

Embodiment B is a method of printing ink onto an article that comprises providing a colorant, a first resin, a second resin, an aminosilane; and an organic solvent. The second resin is a styrene maleic anhydride and the second resin is different to the first resin. The method comprises inkjet printing the ink onto at least a portion of a surface of an article.

The method of Embodiment B further wherein the at least a portion of the surface of the article has condensation thereon.

The method of Embodiment B or Embodiment B with any of the intervening features wherein the article comprises drink packaging and/or food packaging.

Embodiment C is a method of producing an ink jet ink wherein the method includes mixing in an organic solvent such as a colorant, a first resin, a second resin, an aminosilane and optionally, salt wherein the second resin is a styrene maleic anhydride and the second resin is different to the first resin.

The invention claimed is:

1. An inkjet ink comprising:
    a colorant;
    a first resin;
    a second resin;
    an aminosilane; and
    an organic solvent;
    wherein the second resin is a styrene maleic anhydride and the second resin is different to the first resin.
2. The ink of claim 1, further comprising a salt.
3. The ink of claim 1, wherein the styrene maleic anhydride is a partial mono ester of styrene maleic anhydride.
4. The ink of claim 1, wherein the second resin is present in an amount of from about 0.5 to about 10% by weight of the ink.
5. The ink of claim 1, wherein the second resin has a weight average molecular weight (Mw) of about 2,000 to about 20,000.
6. The ink of claim 1, wherein the colorant is present in an amount of from about 2 to about 25% by weight of the ink.
7. The ink of claim 1, wherein the first resin is present in an amount of from about 2.5 to about 25% by weight of the ink.
8. The ink of claim 1, wherein the aminosilane is an organofunctional aminosilane.
9. The ink of claim 1, wherein the aminosilane is present in an amount of from about 0.25 to about 5% by weight of the ink.
10. The ink of claim 1, wherein the inkjet ink is a valve jet inkjet ink.
11. The ink of claim 1, wherein the first resin is an acidic resin.
12. The ink of claim 11, wherein the acidic resin is an acrylic resin.
13. The ink of claim 1, wherein the colorant is a pigment.
14. The ink of claim 13, wherein the pigment is an opaque pigment.
15. The ink of claim 13, wherein the pigment is an organic pigment.
16. A cartridge comprising the ink of claim 1.
17. A method of printing an inkjet ink onto an article, the method comprising:
    providing an inkjet ink comprising:
        a colorant;
        a first resin;
        a second resin;
        an aminosilane;
        an organic solvent;
    wherein the second resin is a styrene maleic anhydride and the second resin is different to the first resin; and
    inkjet printing the ink onto at least a portion of a surface of an article.
18. The method of claim 17, wherein the at least a portion of the surface of the article has condensation thereon.
19. The method of claim 17, wherein the article comprises drink packaging and/or food packaging.
20. A method of producing an inkjet ink, the method comprising:
    mixing an organic solvent with a colorant; a first resin; a second resin; an aminosilane; and optionally, a salt;
    wherein the second resin is a styrene maleic anhydride and the second resin is different to the first resin.

* * * * *